(12) United States Patent
Batke et al.

(10) Patent No.: US 8,886,746 B2
(45) Date of Patent: Nov. 11, 2014

(54) DIAGNOSTIC MODULE FOR DISTRIBUTED INDUSTRIAL NETWORK INCLUDING INDUSTRIAL CONTROL DEVICES

(75) Inventors: Brian A. Batke, Novelty, OH (US); Gary W. Baczkowski, Seven Hills, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/556,088

(22) Filed: Sep. 9, 2009

(65) Prior Publication Data

US 2011/0060427 A1  Mar. 10, 2011

(51) Int. Cl.
*G06F 15/16* (2006.01)
*G05B 23/02* (2006.01)

(52) U.S. Cl.
CPC ................................ *G05B 23/0267* (2013.01)
USPC ........... 709/217; 709/218; 709/219; 709/223; 709/234; 709/246

(58) Field of Classification Search
USPC ......... 709/223, 224, 226, 217, 218, 219, 234, 709/246
See application file for complete search history.

(56) References Cited

U.S. PATENT DOCUMENTS

| | | | |
|---|---|---|---|
| 7,606,890 B1 * | 10/2009 | Baier et al. .................... | 709/224 |
| 2002/0120727 A1 * | 8/2002 | Curley et al. .................. | 709/223 |
| 2003/0046377 A1 * | 3/2003 | Daum et al. ................... | 709/223 |
| 2004/0122921 A1 * | 6/2004 | Dausch et al. ................ | 709/223 |
| 2005/0188267 A1 * | 8/2005 | Farchmin et al. .............. | 714/35 |
| 2007/0130310 A1 * | 6/2007 | Batke et al. ................... | 709/223 |
| 2007/0186011 A1 * | 8/2007 | Batke et al. ................... | 709/246 |

\* cited by examiner

*Primary Examiner* — Edward Kim
(74) *Attorney, Agent, or Firm* — Boyle Fredrickson, S.C.

(57) ABSTRACT

A network component for an industrial automation system. The component includes a network switch processor configured to implement a networking switching function, at least one communication port configured to provide a communication channel between the network switch processor and at least one industrial control device over a network, and a diagnostic module configured to be implemented by the network switch processor and configured to retrieve diagnostic information from the at least one industrial control device.

23 Claims, 3 Drawing Sheets

DIAGNOSTIC MODULE FOR DISTRIBUTED INDUSTRIAL NETWORK INCLUDING INDUSTRIAL CONTROL DEVICES

BACKGROUND

The present invention relates generally to industrial control networks for controlling machines and industrial processes, and, in particular, to a diagnostic module allowing greater diagnostic monitoring for distributed industrial networks interconnecting industrial controllers.

Industrial controllers are used to control and monitor industrial processes and machinery. A typical industrial controller includes a special-purpose computer that executes a stored control program to read inputs from and provide outputs to the controlled process, based on the logic of the control program. Industrial controllers typically generate and store diagnostic information related to the operation of the controller.

Industrial controllers differ from conventional computers in three respects. First, industrial controllers are highly customizable to fit the demands of the particular industrial process being controlled. Typically, this customization is made possible by a modular construction which provides different components that may be added to the industrial controller to expand it for a particular application. Most typically, these additional components will be I/O (input/output) modules that provide analog or digital signals to actuators or that receive analog or digital signals from sensors. Other common components include displays and motor drives.

The second difference between industrial controllers and conventional computers is that the components of the industrial controller can be separated by considerable distances, for example, distributed over a network communicating throughout a factory. A number of proprietary high-speed control networks are used for this purpose including, for example, ControlNet and DeviceNet, open standards managed by a multi-industry consortium ODVA (www.odva.org).

Third, industrial controllers, unlike conventional computers, must provide highly predictable and reliable control outputs that may safely control physical equipment. In this regard, it is imperative both that the outputs and inputs be delivered rapidly and that there be assurance that the outputs and inputs have, in fact, been communicated. Further, it is important that any issues with the controllers, as shown in the controller-generated diagnostic information, be quickly and effectively communicated. Corruption of the data communication or spurious messages cannot be allowed.

Accordingly, in an industrial control network, a user needs the ability to quickly diagnose device or network-related problems when they occur. These problems may often be diagnosed based on symptoms experienced by the network including, but not limited to, communication to robots being interrupted, communication to personal computers being very slow, erroneous messages being sent by network components, etc. Because of the disparate nature of these problems, it would be advantageous to have easy access to diagnostic data from the variety of components associated with the control system.

However, diagnostic data is not always readily available in an industrial control network. Diagnostic data may be scattered throughout many possible industrial devices on the network. Further, the diagnostic data may be represented inconsistently in the different devices, both in format and content. Yet further, the end devices do not proactively send diagnostic notifications. Accordingly, it is difficult for user to both discover devices on the network and to identify which devices may be malfunctioning and the nature of any malfunctions that do occur.

What is needed is a system and method for distributed industrial network diagnostics. What is further needed is such a system and method implemented by a diagnostic agent configured to interface with the other devices on the industrial control network in a highly customizable environment. What is yet further needed is such a system and method configured to provide a diagnostic management station to allow a user to obtain information regarding the network.

SUMMARY OF THE INVENTION

A network switch may be configured to execute a diagnostic information module configured to retrieve diagnostic information from any industrial control device couple to the switch through the switch's data ports and an industrial control network. The diagnostic module may be configured to obtain this information from a variety of types of industrial control devices that are creating and storing the diagnostic information in a variety of formats and with varying content. The diagnostic module may be configured to identify the industrial control devices and their associated protocols to facilitate this process.

The network switch may be coupled to a diagnostic information management station configured to communicate using any of a variety of protocols such as SNMP, industrial network protocols (e.g, the Control and Information Protocol (CIP), Modbus/TCP, etc.), and HTTP. The management stations may further be utilized to modify the diagnostic information management behavior of both the module and the associated industrial control devices.

The present invention provides a network component for an industrial automation system. The component includes a network switch processor configured to implement a networking switching function, at least one communication port configured to provide a communication channel between the network switch processor and at least one industrial control device over a network, and a diagnostic module configured to be implemented by the network switch processor and configured to retrieve diagnostic information from the at least one industrial control device.

These particular objects and advantages may apply to only some embodiments falling within the claims and thus do not define the scope of the invention.

DETAILED DESCRIPTION OF THE PREFERRED EMBODIMENT

The present invention relates to a system and method for generating and providing network diagnostic information in an industrial control environment. According to an exemplary embodiment, a diagnostic agent for receiving and managing diagnostic information may be implemented as a switch or standalone appliance in a control network and be configured to collect diagnostic information from devices for storage in a diagnostic information repository.

Figure 1:
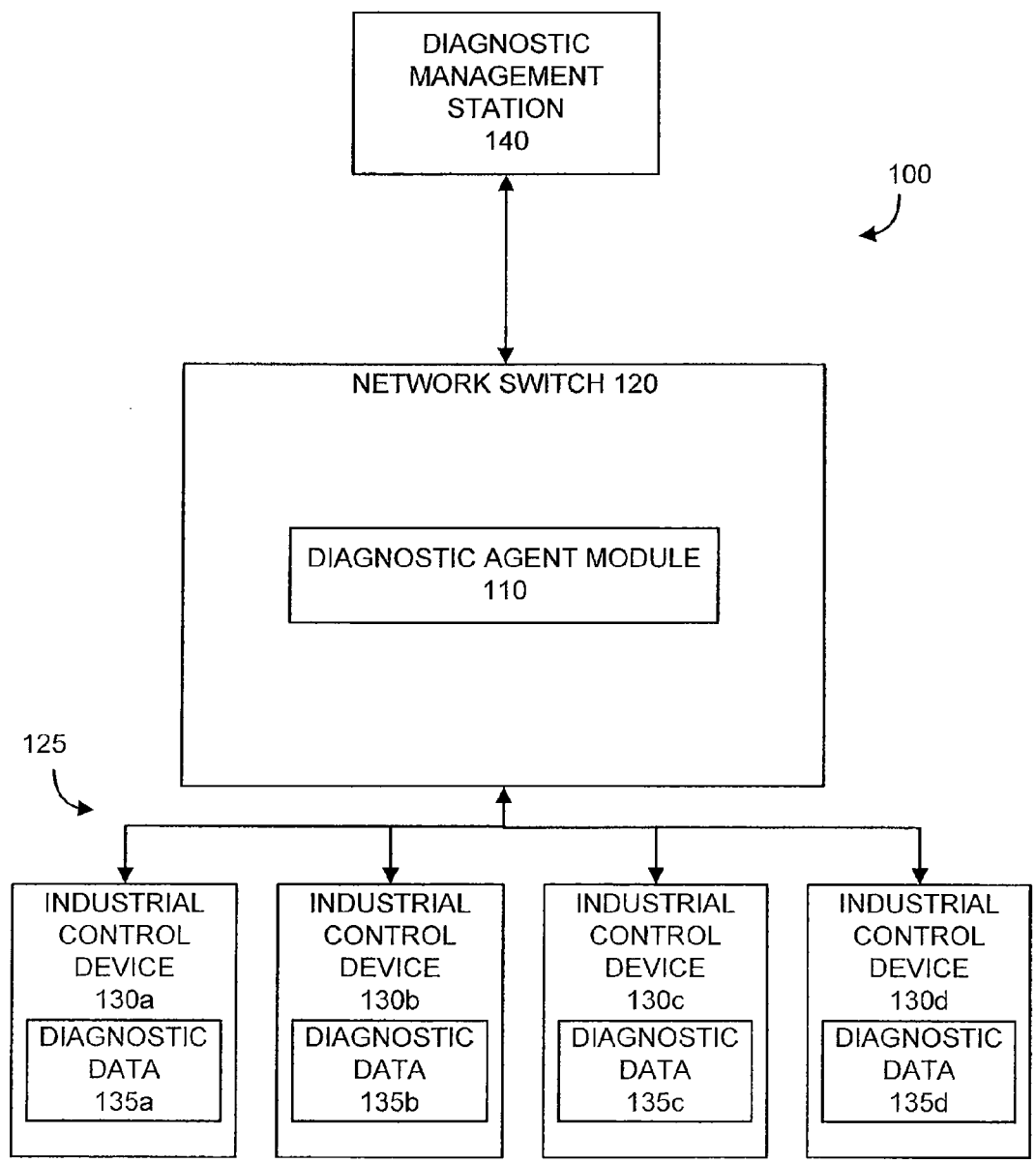
FIG. 1 is a block diagram showing elements of an exemplary industrial control system connected using an Ethernet network and using the invention both as a freestanding device and embedded into a control device, according to an exemplary embodiment.

Referring now to FIG. 1, an industrial control and communications architecture 100 is shown, according to an exemplary embodiment. Industrial control and communications architecture 100 includes a network switch 120 having an integrated diagnostic module 110, a plurality of industrial control devices 130, each device being associated with its own diagnostic data 135, and at least one diagnostic management station 140. Although control and communications architecture 100 is shown and described herein as including particular components in a particular configuration, it should be understood that architecture 100 may include additional, fewer, and/or a different configuration of components to perform the functions described herein.

It is noted that the components associated with the industrial control and communications architecture 100 can include various computer or network components such as servers, clients, programmable logic controllers (PLCs), communication modules, mobile computers, wireless components, control components, and so forth. Similarly, the term PLC as used herein can include functionality that can be shared across multiple components, systems, and/or networks. For example, one or more PLCs can communicate and cooperate with various devices across the network. This can include substantially any type of control, communication module, computer, I/O device, sensor, Human Machine Interface (HMI), etc. that communicate via the network which includes control, automation, and/or public networks. The PLC can also communicate to and control various other devices such as Input/Output modules including Analog, Digital, Programmed/Intelligent I/O modules, other programmable controllers, communication modules, sensors, output devices, and the like.

The network can include public networks such as the Internet, Intranets, and automation networks that include protocols such as Common Industrial Protocol (CIP) including DeviceNet and ControlNet. Other networks include Ethernet, DH/DH+, Remote I/O, Fieldbus, Modbus, Profibus, wireless networks, serial protocols, and so forth. In addition, the network devices can include various hardware and/or software components. These include components such as switches with virtual local area network (VLAN) capability, LANs, WANs, proxies, gateways, routers, firewalls, virtual private networks (VPN) devices, servers, clients, computers, configuration tools, monitoring tools, and/or other devices.

Network switch 120 may be configured to include switch implemented diagnostic module 110 configured to implement a network health diagnostic function in an industrial control architecture. According to an exemplary embodiment, switch 120 may be implemented as an industrial switch. The ruggedized, higher temperature and vibration specifications that are often utilized for industrial switches may be required for performance in harsh industrial environments. A network switch is a computer networking device that connects network segments. Generally, network switches are configured for inspecting data packets transmitted within architecture 100 as they are received, determining the source and destination device of that packet, and forwarding it appropriately. As shown in FIG. 1, switch 120 may be configured to interconnect the devices 130 using architecture 100. Switch 120 may further be configured to implement a diagnostic function using module 110, described in further detail below with reference to FIGS. 2 and 3. The diagnostic function implemented by switch 120 pertains to the particular application function of devices 130 and is in addition to network diagnostic information typically implemented by a network switch (e.g., packet counts, network errors, etc.)

Although shown and described herein as a switch implemented diagnostic module, diagnostic module 110 may alternatively by implemented as a stand alone appliance linked to network 125.

Devices 130 may be any type of devices to be utilized in the industrial control architecture 100. Exemplary devices may include supervisory control and data acquisition (SCADA) systems, distributed control systems (DCS), and other smaller control system configurations such as skid-mounted Programmable Logic Controllers (PLC).

Devices 130 may be configured to include a set of diagnostic data 135. Diagnostic data 135 may be diagnostic information generated by or otherwise obtained from an associated industrial control device 130. Diagnostic data may include timing differences, feedback value, detected error conditions, etc. According to an exemplary embodiment, diagnostic data 135 may be in a unique format, such as a fixed format, associated with the device 130 that may be different from the format of the diagnostic data 135 of any other device 130. Further, the type of data, amount of data, frequency of data logging, method of data storage, method of data representation, method of data broadcasting, if any, etc. may be different for each diagnostic data 135 of a device 130.

According to an exemplary embodiment, diagnostic data 135 may be configured to be self-describing to allow variable diagnostics across different classes of device 130. Self describing diagnostic data may be defined individually by each device such that is in a device specific format, include device specific information fields, etc. Further, the data may be configured such that the meaning and structure of the data may be determined solely based on the content of diagnostic data 135. Data 135 is configured to include explanatory information to describe the data. For example, an XML representation may be configured to have a label for each data item that describes the item, then the value of the item itself. Diagnostic data 135 may further be network readable network diagnostic information configured to provide information regarding the current operating state of the network and or the particular industrial control device as generated by the industrial control device.

Diagnostic management station 140 may be a software based tool that collects the diagnostic information 135 from one or more of modules 110 and displays the information to the user. The information may be displayed as an integrated depiction of network health showing the overall network health based on the aggregation of diagnostic information from each of the industrial control devices 130. Diagnostic management station 140 may further be utilized for one or more diagnostic system configuration functions, such as configuring thresholds, alarms, etc., configuring modules 110, configuring devices 130, etc.

Switch 120 may communicate with the devices 130 by means of a network 125 of the type well known in the art. For the purpose of the following description it will be assumed that the network 125 is an Ethernet network such as is currently commonly used in this art, supporting an Ethernet compatible industrial control protocol such as EtherNet/IP or Modbus/TCP that may be layered onto the Ethernet protocol. It should be understood however, that the present invention need not be limited to such Ethernet networks. The network and protocol utilized thereon are the network and protocol dictated by each device 130. The network and protocol used for each device will be "native" industrial network and protocol normally used to control the device 130 as a function of the automation application. Switch 120 is configured to use the native industrial protocol to obtain the diagnostic information 135 from the devices.

The Ethernet network 125 may also communicate with other control devices. Examples of such devices include, but are not limited to, diagnostic management station 140, a bridge to other networks, an Internet gateway leading to the Internet, and an operator terminal providing operator control and programs to the one or more of the devices 130a-d.

Figure 2:
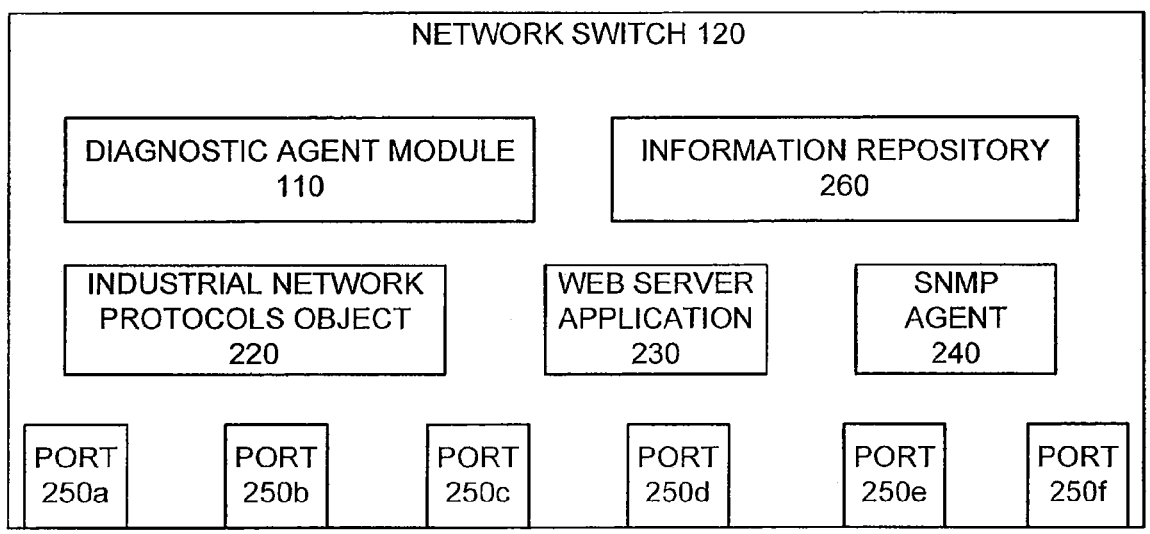
FIG. 2 is a network switch including a diagnostic agent module configured to poll one or more devices in an industrial control architecture, according to an exemplary embodiment.

Referring now to FIG. 2, a network switch 120 including a diagnostic agent module 110 configured to poll one or more devices in an industrial control architecture is shown, according to an exemplary embodiment. An exemplary switch is described in detail in U.S. patent application Ser. No. 11/862,909, filed Sep. 27, 2007 and incorporated herein in its entirety. Network switch 120 may be configured to include a plurality of switch ports 250a-f configured to allow connection of the switch 120 to devices 30 as discussed above with reference to FIG. 1. Switch 120 may further be configured to include a diagnostic information repository 260. Switch 120 is configured to provide a plurality of capabilities that facilitate diagnostic information management of control systems on the network 125. The capabilities may include receiving and promulgated diagnostic information, logging diagnostic information, comparing received diagnostic information to one or more threshold conditions, etc.

The switch 120 may by configured using a profile page in programming software, for example implemented by diagnostic management station 140, described in further detail below. The switch may be configured via a network program such as Telnet or SNMP or configurable through a network protocol such as CIP™ via messaging commands. The switch 120 may be configurable for various fault conditions, threshold limits, diagnostic information storage and conveyance, etc.

Diagnostic agent 210 may be a system and/or method implemented by the switch 120. Diagnostic agent may be implemented as a computer implemented method stored on a computer readable medium to be executed by components of the switch 120. Diagnostic agent 210 may be associated with one or more communication objects allowing the diagnostic agent 210 to communicate diagnostic information to one or more users and/or applications, such as diagnostic management station 140, using any of a variety of protocols/systems such as an industrial network protocols object 220, a web server application 230, and an SNMP agent 240. The SNMP agent 240 may further be configured to include MIB data from a database of managed objects accessed by network management protocols. SNMP MIB data may be a set of parameters which diagnostic management station 140 can query or set in the SNMP agent of a network device such as switch 120.

According to an exemplary embodiment, diagnostic agent 210 may be configured to act as an agent for collect diagnostic information from devices that are attached to switch 120 through switch ports 250a-f. In order to collect diagnostic information, diagnostic agent 210 may be initialized utilizing a discovery protocol. The discovery protocol may be implemented using any of a variety of registration protocols, such as receiving a preconfigured list of devices attached to switch 120, sending a broadcast inquiry message from switch 120 to all devices attached to switch 120 through switch ports 250, iteratively attempting communication using a listing of different protocols, etc. The discovery protocol may be alternatively be provided by the industrial protocol. For example, switch 120 may be configured to learn what type of device is attached by trying any number of industrial protocols defined as part of a configuration procedure for switch 120. Alternatively, diagnostic agent 210 may be initialized via explicit configuration using diagnostic management station 140.

Diagnostic information repository 260 may be any type of database configured to receive and store diagnostic information received from any of devices 130. Diagnostic information repository 260 may be configured to be accessible via different interfaces and protocols using any of the variety of protocols/systems such as an industrial network protocols object 220, a web server application 230, and an SNMP agent 240.

Figure 3:
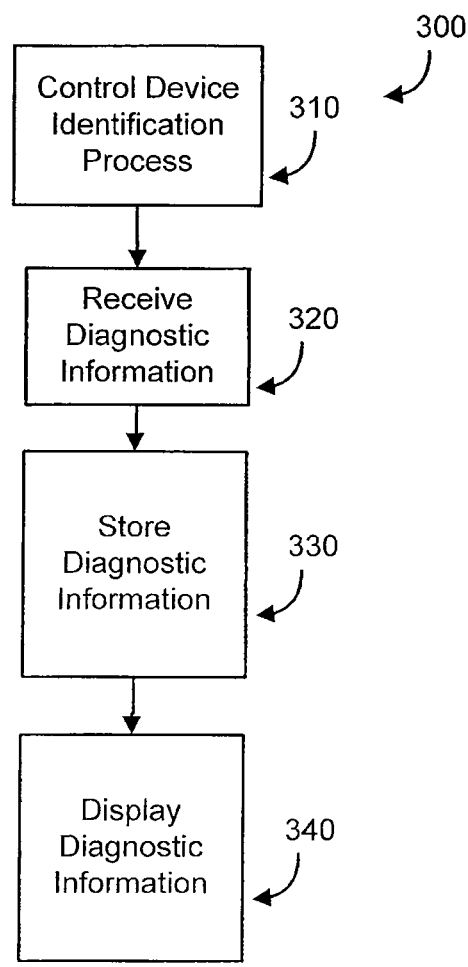
FIG. 3 is a flowchart illustrating a method for generating and providing network diagnostic information in an industrial control environment

Referring now to FIG. 3, a method 300 for initializing devices and receiving diagnostic information from one or more industrial control network devices in an Ethernet switch is shown, according to an exemplary embodiment. Although method 300 shows specific steps performed in a specific order, it should be understood by one of ordinary skill in the art that the method may include more, fewer, and/or a different ordering steps to implement the diagnostic function described herein.

In a step 310, diagnostic module 110 may be configured to identify the end devices 130 attached to the control network 125. The identification may be implemented using any or a combination of identification methods. In a first identification method, a listing of devices 130 may be provided manually to module 110 by a user using, for example, diagnostic management stations 140. Using a second identification method, module 110 may be configured to discover the devices attached to network 125 using known EtherNet/IP protocol methods via auto discovery.

Diagnostic module 110 may be configured to generate a network topology of the industrial device based on the identification of devices 130. The network topology may include a device identification, a device type, a device native protocol, device functional information, etc.

Following identification of the end devices 130, the diagnostic information 135 may be obtained from the devices in a step 320. According to an exemplary embodiment, the protocol for exchanging diagnostics between diagnostic module 110 and devices 130 may be EtherNet/IP. This may be implemented as a polled operation, where module 20 transmits queries to devices 130 or broadcasts a general request for information through network 125 or may be implemented as a push operation, where devices 130 transmit the diagnostic information 135 to module 110 via a publish/subscribe protocol. The polling operation may be implemented within switch 120 by querying each port of the switch having an active device associated therewith. The push operation transmission may be sent periodically or transmission may be event driven, such as based on a detected change, occurrence of an error condition, a threshold, etc.

According to an exemplary embodiment, module 110 is configured to receive the diagnostic information 135 in the native protocol for each device 130. Each native industrial protocol for end device 130 may be discovered during the discovery protocol of step 310. Alternatively, module 110 may be configured with a listing of known devices and associated protocols.

Module 110 may be configured to stored received diagnostic information in data repository 260 in a step 330. The information may be stored such that it is accessible using the protocols/systems such as an industrial network protocols object 220, a web server application 230, and an SNMP agent 240. The diagnostic information may be accessed and manipulated using a human machine interface such as the diagnostic information management station 140 in a step 340.

The present invention has been described in terms of the preferred embodiment, and it is recognized that equivalents, alternatives, and modifications, aside from those expressly stated, are possible and within the scope of the appended claims.

We claim:

1. An industrial control system comprising:
a plurality of industrial control devices configured to control and monitor industrial processes and machinery each industrial control device providing an electronic network interface and generating and providing network readable network diagnostic information including information regarding the current operating state of the network based on symptoms experienced by the network as detected by each industrial control device in transmitted status messages sent from the industrial control devices;
a diagnostic management interface providing a human machine interface to an operator; and
a network appliance communicating with the diagnostic management interface and providing an electronic network interface communication with the plurality of industrial control devices, the network appliance including an electronic computer executing a stored program to perform the steps of:
(1) communicate with the plurality of industrial control devices to collect network readable network diagnostic information generated by the industrial control devices and transmitted from the industrial control devices to the network appliance;
(2) translate the collected network diagnostic information into a common format;
(3) present an integrated depiction of the network health from the translated collected network diagnostic information; and
(4) transmitting the translated collected network diagnostic information to the diagnostic management interface for presentation on the interface.

2. The industrial control system of claim 1, wherein the network appliance is configured to identify the industrial control devices and determine the native protocol used by each device.

3. The industrial control system of claim 2, wherein the network appliance is configured to retrieve diagnostic information utilizing the native protocol of the industrial control device.

4. The industrial control system of claim 2, wherein the network appliance is configured to generate a network topology based on the identification of the industrial control devices.

5. The industrial control system of claim 1, wherein the network appliance further includes a data repository configured to receive and store the diagnostic information for the network appliance in the native format of the industrial control device.

6. The industrial control system of claim 1, wherein the network appliance is configured to receive instructions through the diagnostic management interface utilized to modify the diagnostic configuration of at least one industrial control device.

7. The industrial control system of claim 1, wherein the diagnostic information station interface is configured to provide communication with the diagnostic management interface using the common industrial protocol.

8. The industrial control system of claim 1, wherein the network appliance is configured to identify the at least one industrial control device using an initialization broadcast message.

9. The industrial control system of claim 8, wherein the initialization broadcast message is further utilized to identify the native protocol of at least one industrial control device.

10. The industrial control system of claim 1, wherein the network appliance is configured to monitor network data traffic for diagnostic information being transmitted by an industrial control device.

11. The industrial control system of claim 1, wherein the network appliance is configured to broadcast one or more requests for diagnostic information to the industrial control devices.

12. A computer implemented method for implementing diagnostic information management in a computer network switch for an industrial automation system, comprising:
providing a networking switching function over and industrial automation system network;
communicating with at least one industrial control device over the industrial automation system network;
receiving network diagnostic information including information regarding the current operating state of the network based on symptoms experienced by the network as detected by the at least one industrial control device from the at least one industrial control device in transmitted status messages sent from the industrial control devices configured to control and monitor industrial processes and machinery and transmit the status messages over the industrial automation system network in a native protocol of the industrial control device; and
translating the received network diagnostic information to a common protocol.

13. The method of claim 12, further including identifying the industrial control devices and determine the native protocol used by each device.

14. The method of claim 13, wherein receiving diagnostic information includes requesting and receiving the information utilizing the native protocol of the industrial control device.

15. The method of claim 13, further including generating a network topology based on the identification of the industrial control devices.

16. The method of claim 12, further including storing the diagnostic information for the diagnostic module in the native format of the industrial control device.

17. The method of claim 12, further including transmitting and receiving information between the data repository and a diagnostic management station.

18. The method of claim 17, further including receiving instructions through the diagnostic management interface utilized to modify the diagnostic behavior of at least one of the industrial control devices.

19. The method of claim 17, wherein communication with the diagnostic management station is implemented using the common industrial protocol.

20. The method of claim 12, further including indentifying the at least one industrial control device using an initialization broadcast message transmitted through each of the one or more ports.

21. The method of claim 20, wherein identify the at least one industrial control device further includes identifying the native protocol of at least one industrial control device.

22. The method of claim 12, further including monitoring network data traffic for diagnostic information being transmitted by an industrial control device.

23. The method of claim 12, further including broadcasting one or more requests for diagnostic information through the one or more ports of the network component.

* * * * *